(12) United States Patent
Reed et al.

(10) Patent No.: US 7,119,134 B2
(45) Date of Patent: Oct. 10, 2006

(54) NANOCOMPOSITE COLOR CONCENTRATE PELLETS

(75) Inventors: David Bruce Reed, Washington, MI (US); Robert A. Ottaviani, Anthem, AZ (US)

(73) Assignee: General Motors Corporation, Detroit, MI (US)

( * ) Notice: Subject to any disclaimer, the term of this patent is extended or adjusted under 35 U.S.C. 154(b) by 381 days.

(21) Appl. No.: 10/319,444

(22) Filed: Dec. 13, 2002

(65) Prior Publication Data

US 2004/0122154 A1    Jun. 24, 2004

(51) Int. Cl.
  *C08J 3/22*  (2006.01)
  *C08J 3/20*  (2006.01)
(52) U.S. Cl. ............... 523/351; 524/186; 524/445; 524/447; 501/145; 501/147; 977/DIG. 1
(58) Field of Classification Search .......... 524/445, 524/447, 186; 501/145, 147; 523/351
  See application file for complete search history.

(56) References Cited

U.S. PATENT DOCUMENTS

| | | | |
|---|---|---|---|
| 4,480,064 A * | 10/1984 | Chopra et al. | 524/413 |
| 4,720,514 A * | 1/1988 | Needham | 523/351 |
| 5,552,469 A | 9/1996 | Beall et al. | |
| 5,578,672 A | 11/1996 | Beall et al. | |
| 5,698,624 A | 12/1997 | Beall et al. | |
| 5,760,121 A | 6/1998 | Beall et al. | |
| 5,844,032 A | 12/1998 | Serrano et al. | |
| 5,849,830 A | 12/1998 | Tsipursky et al. | |
| 5,877,248 A | 3/1999 | Beall et al. | |
| 5,910,523 A | 6/1999 | Hudson | 523/213 |
| 6,225,394 B1 | 5/2001 | Lan et al. | |
| 6,228,903 B1 | 5/2001 | Beall et al. | |
| 6,462,122 B1 * | 10/2002 | Qian et al. | 524/445 |
| 6,465,543 B1 | 10/2002 | Alexandre et al. | 523/213 |
| 6,632,868 B1 * | 10/2003 | Qian et al. | 524/445 |
| 6,844,389 B1 * | 1/2005 | Mehta et al. | 524/445 |

OTHER PUBLICATIONS

Basell Polyolefins, Material Safety Data Sheet, Issued & Revised Oct. 18, 2001, Product Name—CB285AC BLK, 6 pages.
Basell Polyoefins, Material Safety Data Sheet, Issued & Revised Sep. 17, 2001, Product Name—CX284AC Black, 9 pages.
Basell Polyolefins, Material Safety Data Sheet, Issued & Revised Jul. 27, 2001, Product Name—CX282AC Black, 10 pages.
Basell Polyolefins, Material Safety Data Sheet, Issued & Revised Oct. 30, 2000, Product Name—CA387A, 9 pages.
Cloisite® 20A, Typical Physical Properties Bulletin, Dec. 12, 2002, 1 page.
ExxonMobil Chemical, Linear Low Density Polyethylene—Rotational Molding Grades, Americas—Mar. 2002, 1 page.
ExxonMobil Chemical, ExxonMobil LL 6407, Injection Molding LLDPE, Sep. 2001, 1 page.
ExxonMobil Chemical, ExxonMobil LD 102—Low Density Polyethylene for Thin Gauged Films, Americas—Rev. Jul. 3, 2001, 1 page.

* cited by examiner

*Primary Examiner*—Tae H. Yoon
(74) *Attorney, Agent, or Firm*—Kathryn A. Marra

(57) ABSTRACT

A method of making a polymeric compound with nanofiller of a predetermined grade. The method includes the steps of providing a base grade of the polymeric material, and mixing a nanofiller concentrate material with the base grade polymeric material in a ratio sufficient to render the predetermined grade of filled polymeric compound, the ratio being nanofiller concentrate material to base grade polymeric material. A method for making the nanofiller concentrate material includes the steps of mixing a high flow carrier resin and a nanofiller to form a mixture, extruding the mixture, and pelletizing the extruded mixture. The mixture may advantageously include colorants, such as pigments or dyes.

25 Claims, No Drawings

NANOCOMPOSITE COLOR CONCENTRATE PELLETS

BACKGROUND OF THE INVENTION

The present invention relates generally to nanocomposites, and more particularly to nanocomposite concentrate materials.

Reactor grade polymers, such as for example thermoplastic olefins (TPO), are relatively flexible, and are generally less expensive than other (e.g. compounded) grades of polymers which have been modified from the reactor grade to exhibit desired mechanical, physical and/or chemical properties. For example, reactor grade polymers such as TPOs may typically be $0.20/pound less expensive than compounded grades.

Reactor grade TPOs may be used, for example, on automotive bumper fascias. This reactor grade TPO is kept in large inventory silos at the molding facility. However, body side molding is generally required to be stiffer than bumpers, and thus the molding facility keeps a separate silo of a stiffer grade of TPO. As can be appreciated, depending upon the part to be molded, the molding facility may have to keep a great number of large inventory silos or containers, each having a different grade of polymeric material therein.

Highly efficient nano particle fillers have been developed which can be compounded with thermoplastics to improve physical properties at less than 6% by weight in place of 20–30% conventional mineral fillers such as talc. However, currently, the nano particle fillers are added directly into the base thermoplastic material. The base thermoplastic material with the nano particle filler material is then compounded (which involves blending, re-melting and mixing) and repelletized to form nano particle filled pellets. The extra compounding and pelletizing step is performed in order to substantially achieve a consistent filler level. This extra compounding step is similar to an additional compounding process step used with conventional 20–30% mineral (talc, calcium carbonate, etc.) filled thermoplastics. As such, nano fillers have not as yet proven cost effective enough to utilize on a regular basis.

SUMMARY OF THE INVENTION

The present invention solves the drawbacks enumerated above by providing a method of making a polymeric material of a predetermined grade. The method includes the steps of providing a base grade of the polymeric material, and mixing a nanocomposite filler concentrate material with the base grade polymeric material in a ratio sufficient to render the predetermined grade of polymeric material, the ratio being nanocomposite filler material to base grade polymeric material. A method for making the nanocomposite filler material includes the steps of mixing a high flow carrier resin and a nanofiller to form a mixture, extruding the mixture, and pelletizing the extruded mixture. The mixture may advantageously include colorants, such as pigments or dyes.

DETAILED DESCRIPTION OF THE EMBODIMENTS

The present invention is predicated upon the unexpected and fortuitous discovery that novel and desirable nanofiller concentrate materials (e.g. pellets, flakes, granules, and the like) may be introduced into a base grade (e.g. a reactor grade) of polymeric material at a predetermined ratio so as to render the equivalent of a desired grade of filled polymeric compound material, i.e. the polymeric material will substantially have the desired mechanical, chemical and/or physical properties of the desired grade of filled polymeric compound material. This advantageously obviates the need for a molding plant to inventory separate silos/containers of various grades of polymeric material. With the present invention, the molding plant need only inventory a base grade of polymeric material, along with a supply of the inventive nanocomposite concentrate material (which material may generally be stored in smaller containers, due to the concentration of the material).

A filled polymeric compound (with conventional fillers or nanofillers) is often subsequently mixed with color concentrate pellets at the molding press in desired let-down ratios to achieve a specific color molded part. The color concentrate material (e.g. pellets, flakes, granules, and the like) has already been specially compounded in a separate operation to incorporate a high concentration of colorant(s), stabilizers and the like with a carrier resin formulated to facilitate dispersion throughout the melt in the subsequent molding press. The present inventors fortuitously discovered that one could take advantage of the color concentrate material's compounding process to incorporate therein nanofillers, and/or to substitute nanofillers for the colorants in the material. In this manner, the plastics manufacturer is saved the extra post-filler compounding step. Without being bound to any theory, it is believed that the extra compounding step is unnecessary since the concentrate composition having nanofillers therein substantially adequately disperses throughout the melted polymeric material (e.g. TPO) during the subsequent molding process.

It is to be understood that the term "base grade" polymeric material as used herein is defined to encompass filled grades of polymeric material as well as reactor grades. It is contemplated as being within the scope of the present disclosure that the present inventive nanocomposite materials (nanofiller concentrates, with or without colorants), in certain instances, may also be effectively and advantageously mixed with grades of polymeric compounds other than reactor/base grades.

A method according to an embodiment of the present invention for making a filled polymeric compound of a predetermined grade, comprises the steps of providing a base grade of polymeric material, and mixing a nanofiller concentrate material with the base grade polymeric material in a ratio sufficient to render the predetermined grade of filled polymeric compound, the ratio being nanofiller concentrate material to base grade polymeric material.

A method for making the nanofiller concentrate material comprises the steps of mixing a high flow carrier resin and a nanofiller to form a mixture, and extruding the mixture. The mixture may then be further processed to form pellets, flakes, granules, and/or the like, as desired. One such further processing step comprises pelletizing the extruded mixture, thereby rendering nanofiller concentrate pellets.

The nanofiller/carrier resin mixture may further include one or more dispersants/compatibilizers and/or one or more stabilizers. It is to be understood that any suitable dispersants/compatibilizers may be used. In an embodiment, the compatibilizer/dispersant comprises maleated propylene. Some non-limitative examples of suitable compatibilizers include Epolene E-43 (maleated polypropylene), Epolene G-3003 (maleated polypropylene), Epolene G-3015 (maleated polypropylene), Epolene C-16 (maleated polyethylene), and Epolene C-18 (maleated polyethylene).

The Epolene series of polyolefin waxes and polymers is commercially available from Eastman Chemical Company, in Kingsport, Tenn. Epolene polymers are medium to low molecular weight polyethylene or polypropylene. They are useful in the plastics industry as lubricants for PVC, processing aids, mold release agents, dispersion aids, and coupling agents. They are also widely used as base polymers for hot-melt adhesives and pavement striping compounds as well as petroleum wax modifiers for use in candles, investment casting, cable filling, and various paperboard coatings. Numerous types of Epolene polymers are available, and properties can be selected to fit various processing operations.

Further non-limitative examples of suitable compatibilizers include Polybond 1001, Polybond 1002, Polybond 1009, Polybond 3000, Polybond 3002, Polybond 3009, Polybond 3150, and Polybond 3200. The Polybond series is commercially available from Uniroyal Chemical Company, USA, and are polypropylenes functionalized with maleic anhydride. Polybond 3150 has a MFI of 50 g/10 min, 230° C., 2, 16 kg; and Polybond 3200 has a MFI of 110 g/10 min, 190° C., 2, 16 kg.

Some non-limitative examples of suitable stabilizers include Irganox® Antioxidant 1010, B-225, B-900, and IRGASTAB® FS 301 and FS 210 FF, each commercially available from Ciba Specialty Chemicals, in Tarrytown, N.Y. Some light stabilizers are commercially available from Ciba Specialty Chemicals under the tradenames CHIMASSORB®. Further available from Ciba is Tinuvin 770 DF, which is a light stabilizer belonging to the class of hindered amine light stabilizers, as well as Tinuvin 944, Tinuvin 123, and Tinuvin 328. A further example of a suitable stabilizer is Organox 168.

Further, if a color concentrate is desired, the mixture may further include one or more colorants, such as pigment(s) and/or dye(s).

It is to be understood that the nanofiller may comprise any suitable compound. In an embodiment, the nanofiller comprises an organoclay.

Some non-limitative examples of suitable organoclay materials include Cloisite Na+, Cloisite 30B, Cloisite 10A, Cloisite 25A, Cloisite 93A, Cloisite 15A, Cloisite 20A. The Coisite clays are proprietary nanoclays commercially available from Southern Clay Products, a subsidiary of Rockwood Specialties, Inc., located in Princeton, N.J.

It is to be understood that the carrier resin may comprise any suitable resin. In an embodiment, the resin comprises polyethylene. In a further embodiment, the resin comprises at least one of low density polyethylene (LDPE), linear low density polyethylene (LLDPE), and mixtures thereof.

It is to be understood that the method and composition of the present invention is suitable for use in many polymeric materials. In an embodiment, the polymeric material is a thermoplastic olefin. It is to be understood that any suitable thermoplastic material may be used. Some non-limitative examples of suitable thermoplastic materials include polyethylenes, nylons (polyamides), polypropylenes, polystyrenes and co-polymers thereof, polyvinyl chloride and copolymers thereof, other vinyls, acrylics, cellulosics, and mixtures thereof.

It is to be understood that any suitable ratio of nanofiller concentrate material to base grade polymeric material (the "let-down" ratio) may be employed, depending upon the amount of filler, or color and filler, desired in the subsequently molded parts. In an embodiment, the ratio is between about 1:10 and about 1:100. In a further embodiment, the ratio is between about 1:25 and about 1:50. In yet a further embodiment, the ratio is between about 1:10 and about 1:25.

It is to be understood that the parts subsequently molded from the filled polymeric compound of the present invention may be used for any suitable applications, as desired. In one embodiment of the present invention, the filled polymeric compound of the predetermined grade forms automotive trim panels (bumper fascias, body side cladding/molding, and the like).

A nanocomposite color concentrate composition according to an embodiment of the present invention comprises at least one color pigment and/or dye (colorant), present in an amount sufficient to produce a predetermined shade of color in a polymeric material into which the nanocomposite color concentrate composition is introduced.

The composition further comprises a nanofiller material present in an amount sufficient to produce a predetermined grade of filled polymeric material when the nanocomposite color concentrate composition is introduced into the polymeric material at a predetermined ratio of concentrate composition to polymeric material.

Further, the composition may comprise a compatibilizer/dispersant material present in an amount sufficient to aid in bonding the colorant and nanofiller with the polymeric material.

A high flow carrier resin is present in an amount sufficient to aid in mixing and dispersing the colorant and nanofiller in the polymeric material.

The composition may further comprise a stabilizer having properties adapted to, and present in an amount sufficient to provide stability toward heat and/or light.

It is to be understood that non-limitative examples of suitable materials for the composition are disclosed hereinabove.

It is to be further understood that the components of the composition may be present in any suitable weight percents, as desired and/or as necessitated by a particular end use. In an embodiment, the carrier resin is present between about 20 weight % and about 40 weight %, the colorant(s) is present between about 20 weight % and about 40 weight %, the nanofiller is present between about 25 weight % and about 50 weight %, the compatibilizer is present between about 0.5 weight % and about 2 weight %, and the stabilizer is present between about 0.5 weight % and about 2 weight %.

In an alternate embodiment, the carrier resin is present at about 30 weight %, the colorant(s) is present at about 30 weight %, the nanofiller is present at about 38 weight %, the compatibilizer is present at about 1 weight %, and the stabilizer is present at about 1 weight %.

In an embodiment of the present invention, the composition is pellet shaped.

A nanocomposite concentrate composition comprises a nanofiller material present in an amount sufficient to produce a predetermined grade of polymeric material when the nanocomposite concentrate composition is introduced into the polymeric material at a predetermined ratio of concentrate composition to polymeric material.

The composition further comprises a compatibilizer material present in an amount sufficient to aid in bonding the nanofiller with the polymeric material; and a high flow carrier resin present in an amount sufficient to aid in mixing and dispersing the nanofiller in the polymeric material. The composition may further comprise a stabilizer having properties adapted to, and present in an amount sufficient to provide stability toward heat and/or light.

It is to be understood that non-limitative examples of suitable materials for the composition are disclosed hereinabove.

It is to be further understood that the components of the composition may be present in any suitable weight percents, as desired and/or as necessitated by a particular end use. In an embodiment, the carrier resin is present between about 20 weight % and about 40 weight %, the nanofiller is present between about 45 weight % and about 80 weight %, the compatibilizer is present between about 0.5 weight % and about 2 weight %, and the stabilizer is present between about 0.5 weight % and about 2 weight %.

In an alternate embodiment, the carrier resin is present at about 30 weight %, the nanofiller is present at about 68 weight %, the compatibilizer is present at about 1 weight %, and the stabilizer is present at about 1 weight %.

In an embodiment, the composition is pellet shaped.

In an embodiment of the present invention, a polyethylene high flow carrier resin, present at about 35 weight %, is mixed with colorant(s) (pigment(s) and/or dye(s)), dispersant(s), stabilizer(s), and nanofillers. It is to be understood that the present inventors use the terms "dispersant" and "compatibilizer" interchangeably herein. The mixture may then be extruded and pelletized to form nanocomposite color concentrate pellets. The pellets may then be placed into containers and shipped directly to a molding facility. The molder may then mix the inventive nanocomposite color concentrate pellets with reactor grade TPO (direct from the TPO Reactor Plant) (or a filled grade of TPO, if desired), and then mold (e.g. injection molding) the part, without need for a separate compounding step before the mold step.

Using the process of the present invention, one adds the color concentrate pellets in a let-down ratio of between about 1:10 and about 1:25, to a TPO under the tradename Basell Hifax CA387A (a grade typically suitable for bumper fascias). These are rubber modified polyolefinic polymer pellets, commercially available from Basell Polyolefins Company in Wilmington, Del. Some typical properties include: an average flexural modulus of 1023 Mpa; and a coefficient of linear thermal expansion (average value for flow direction) of $9.8 \times 10^{-5}/^\circ$ C. After the color concentrate pellets are dispersed within the CA387A, the CA387A substantially exhibits the properties of Basell Hifax CB285AC (a grade typically suitable for body side moldings/claddings), which are polyolefinic polymer pellets filled with talc, commercially available from Basell Polyolefins Company in Wilmington, Del. Some typical properties of CB285AC include: an average flexural modulus of 1350 Mpa; and a coefficient of linear thermal expansion (average value for flow direction) of $4.8 \times 10^{-5}/^\circ$ C.

Before the present invention, color concentrate materials did not include any type of filler material in the concentrate material. The color concentrate materials were mixed with a desired grade of polymeric material which had been compounded to the desired grade at the filler compounding plant. In sharp contrast, the present inventive process eliminates the middle nanocomposite compounding step by incorporating the nanofiller directly into the concentrate pellets (with or without colorants).

If color is desired in the subsequently molded polymeric material, it may be advantageous to combine the colorants and the nanofillers into one concentrate material (such as, for example, pellets, granules, flakes and/or the like). In that way, the processor would need to do a single compounding step to render the concentrate pellets having both colorants and fillers, as opposed to a compounding step to render filler concentrate pellets, and a compounding step to render color concentrate pellets. Or, if preferred, the colorants can be added separately by mixing conventional color concentrate pellets with the nanofiller concentrate pellets. It is to be understood that the nanofiller concentrate pellet(s) may be mixed with a color concentrate pellet(s) and a base resin in any combination or order or mixing.

As can be appreciated from the disclosure herein, this inventive process and composition advantageously avoids the inventory of much larger volumes of thermoplastic compounds. Further, this process allows the use of a high flow carrier resin and dispersant to facilitate exfoliation and dispersion of the nanofiller material.

Several U.S. Patents, each of which is incorporated by reference herein, disclose various means of treating Nano fillers such as phyllosilicates, smectite clays, montmorillinites etc. to facilitate intercalation and exfoliation in the polymer matrix: U.S. Pat. Nos. 6,228,903; 6,225,394; 5,877,248; 5,849,830; 5,844,032; 5,760,121; 5,698,624; 5,578,672; and 5,552,469.

Exfoliation and dispersion of the nanofiller in the concentrate pellet may be facilitated by creation of an admixture using a variety of exfoliants such as waxes, maleated propylene or other low molecular polymers prior to combining with the carrier resin or other ingredients in the concentrate pellet. For example, introducing all the concentrate ingredients into one mixing machine at one time with the nanofiller and trying to get suitable exfoliation may, in some instances, be counterproductive.

Exfoliation and dispersion of the nanofiller in the concentrate pellet may in some instances be further or alternately facilitated by staging the mixing using a combination of high speed mixers and other mixers—analogous to mixing a cake batter at various speeds depending on viscosity to avoid "lumpiness".

Further or alternately, exfoliation and dispersion of the nanofiller in the concentrate pellet may in some instances be facilitated by controlling the temperature of the mix to assure suitable viscosity for optimum mixing.

Exfoliation and dispersion of the nanofiller in the concentrate pellets throughout the molded part may further or alternately, in some instances, be facilitated by choice of a suitable screw design and mastication time, pressure and temperature with or without an after mixer in the screw barrel of an injection molding machine or extrusion machine.

Exfoliation and dispersion of the nanofiller in the concentrate pellets throughout the molded part may further or alternately, in some instances, be facilitated by optimizing the temperature of the melt in the injection molding barrel (in the case of injection molding).

Further or alternately, exfoliation and dispersion of the nanofiller in the concentrate pellets throughout the molded part may be facilitated by optimizing the rate of injection of the melt into the part tool (in the case of injection molding).

It is to be understood that it is not generally seen as desirable to form the concentrate pellets of the present invention with conventional fillers (talc, calcium carbonate, etc.), because a large amount of such conventional fillers would need to be incorporated. As such, the let down ratio of such pellets with conventional fillers would be about 1:4 (pellets to base resin). In contrast, the let down ratios of embodiments of the present invention (since nanofillers are so efficient) may be from about 1:7 (1:11 being one such embodiment) to about 1:100.

However, it is to be understood that the present invention substantially duplicates the properties of a talc-filled polymeric compound, and may optionally advantageously have color concentrate dispersed therein.

Nanocomposite fillers at 4 or 5%, are as effective as 20 or 30% of conventional fillers such as talc, calcium carbonate, etc.

When painting the body color, the car is baked. The body molding having the color concentrate therein shrinks during the bake; but with embodiments of the present invention, one may advantageously adjust the ratio of nanofiller concentrate to base resin so that the molding shrinks less (more color/filler concentrate). As such, one may use the same tool instead of one or several tools with different shrink ratios. This saves time and money.

The savings gleaned from embodiments of the present invention include cost savings (in materials, labor (fewer processing steps), time, and space for inventory), and can reduce the amount/type of inventory necessary for a molding facility.

The process of the present invention covers the incorporation of the nanocomposite filler into the concentrate pellets, with or without colorants, instead of directly into the base thermoplastic resin. This process combines the ability of nanoparticle fillers to improve physical properties at less than 6% by weight with the ability to be included in the color concentrate pellets and disperse with the color concentrate carrier resin. This process substantially eliminates the pre-compounding process step and saves the cost of compounding the nanoparticle filler into the base thermoplastic pellets. This process also avoids the multiplication and inventory of much larger volumes of thermoplastic compounds that would otherwise contain nanocomposite fillers and/or conventional fillers.

An additional benefit and enabler of the nanocomposite color concentrate pellet is that the color concentrate pellet inherently has more room for the nanofiller because the final part may contain only about 4% nanofiller instead of about 20% conventional filler such as talc or calcium carbonate. Less color pigment is required in the concentrate pellet because the reduced filler in the net part does not require as much pigment to mask the "whitening" effect of the talc or calcium carbonate.

While several embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A method of making a filled polymeric compound of a desired grade, comprising the steps of:
   providing a base grade of polymeric material;
   mixing one of a color concentrate material or a nanofiller concentrate material with the base grade polymeric material; and
   mixing an other of the nanofiller concentrate material or the color concentrate material with the base grade polymeric material having the one of the color concentrate material or the nanofiller concentrate material mixed therein;
   wherein the nanofiller concentrate material is mixed in a ratio sufficient to render the desired grade of filled polymeric compound, the desired grade being different from the base grade, and the ratio being nanofiller concentrate material to base grade polymeric material; and wherein the nanofiller concentrate material is in a form selected from pellet, flakes, granules, and combinations thereof.

2. The method as defined in claim 1 wherein a method for making the nanofiller concentrate material comprises the steps of:
   mixing a high flow carrier resin and a nanofiller to form a mixture;
   extruding the mixture; and
   pelletizing the extruded mixture, thereby rendering nanofiller concentrate pellets.

3. The method as defined in claim 2 wherein the mixture includes a dispersant and a stabilizer.

4. The method as defined in claim 1 wherein the color concentrate material includes at least one of pigment and dye.

5. The method as defined in claim 2 wherein the nanofiller comprises an organoclay.

6. The method as defined in claim 2 wherein the carrier resin comprises polyethylene.

7. The method as defined in claim 1 wherein the polymeric material is a thermoplastic olefin.

8. The method as defined in claim 1 wherein the ratio is between about 1:10 and about 1:100.

9. The method as defined in claim 8 wherein the ratio is between about 1:25 and about 1:50.

10. The method as defined in claim 8 wherein the ratio is between about 1:10 and about 1:25.

11. The method as defined in claim 1 wherein the filled polymeric compound of the desired grade forms automotive trim panels.

12. A method of making a filled polymeric compound of a desired grade, comprising the steps of:
    providing a base grade of polymeric material; and
    mixing color concentrate pellets having nanofiller concentrate material therein with the base grade polymeric material in a ratio sufficient to render the desired grade of filled polymeric compound, the ratio being nanofiller concentrate material to base grade polymeric material;
    wherein a method for making the color concentrate pellets having nanofiller concentrate material therein comprises the steps of:
       mixing a high flow carrier resin, a dispersant, a stabilizer, at least one of pigment or dye present in an amount ranging between about 20 weight % and about 40 weight %, and a nanofiller to form a mixture;
       extruding the mixture; and
       pelletizing the extruded mixture, thereby rendering the color concentrate pellets having nanofiller concentrate material therein.

13. The method as defined in claim 12 wherein the nanofiller comprises an organoclay, the carrier resin comprises polyethylene, and the polymeric material is a thermoplastic olefin.

14. A nanocomposite color concentrate composition, comprising:
    at least one of color pigment or dye, present in an amount sufficient to produce a desired shade of color in a polymeric material into which the nanocomposite color concentrate composition is introduced;
    a nanofiller material present in an amount sufficient to produce a desired grade of filled polymeric material when the nanocomposite color concentrate composition is introduced into the polymeric material at a desired ratio of concentrate composition to polymeric material;

a compatibilizer material present in an amount sufficient to aid in mixing and dispersing the at least one of pigment and dye and nanofiller in the polymeric material; and a high flow carrier resin present in an amount sufficient to aid in mixing and dispersing the at least one of pigment and dye and nanofiller in the polymeric material;

wherein the carrier resin is present between about 20 weight % and about 40 weight %, the at least one of pigment or dye is present between about 20 weight % and about 40 weight %, the nanofiller is present between about 25 weight % and about 50 weight %, and the compatibilizer is present between about 0.5 weight % and about 2 weight %.

15. The composition as defined in claim 14, further comprising a stabilizer having properties adapted to, and present in an amount sufficient to provide stability toward at least one of heat and light.

16. The composition as defined in claim 14 wherein the resin comprises polyethylene, the nanofiller comprises an organoclay, and the compatibilizer comprises maleated propylene.

17. A nanocomposite color concentrate composition, comprising:

at least one of color pigment or dye, present in an amount sufficient to produce a desired shade of color in a polymeric material into which the nanocomposite color concentrate composition is introduced;

an organoclay nanofiller material present in an amount sufficient to produce a desired grade of filled polymeric material when the nanocomposite color concentrate composition is introduced into the polymeric material at a desired ratio of concentrate composition to polymeric material;

a maleated propylene compatibilizer material present in an amount sufficient to aid in mixing and dispersing the at least one of pigment and dye and nanofiller in the polymeric material;

a high flow carrier polyethylene resin present in an amount sufficient to aid in mixing and dispersing the at least one of pigment and dye and nanofiller in the polymeric material; and a stabilizer having properties adapted to, and present in an amount sufficient to provide stability toward at least one of heat and light;

wherein the carrier resin is present between about 20 weight % and about 40 weight %, the at least one of pigment and dye is present between about 20 weight % and about 40 weight %, the nanofiller is present between about 25 weight % and about 50 weight %, the compatibilizer is present between about 0.5 weight % and about 2 weight %, and the stabilizer is present between about 0.5 weight % and about 2 weight %.

18. The composition as defined in claim 17 wherein the carrier resin is present at about 30 weight %, the at least one of pigment and dye is present at about 30 weight %, the nanofiller is present at about 38 weight %, the compatibilizer is present at about 1 weight %, and the stabilizer is present at about 1 weight %.

19. The composition as defined in claim 18 wherein the composition is pellet shaped.

20. A method for making a nanofiller color concentrate material, comprising the steps of:

mixing a high flow carrier resin, a colorant present in an amount ranging from about 20 weight % to about 40 weight %, and a nanofiller to form a mixture;

extruding the mixture; and pelletizing the extruded mixture, thereby rendering nanofiller color concentrate pellets configured to produce a desired shade of color in a polymeric material into which the color concentrate material is added.

21. The method as defined in claim 20 wherein the mixture includes a dispersant and a stabilizer.

22. The method as defined in claim 20 wherein the colorant is at least one of pigment or dye.

23. The method as defined in claim 12, wherein the color concentrate pellets having nanofiller concentrate material therein substantially disperses throughout the base grade polymeric material without a subsequent compounding step.

24. A method of making a filled polymeric compound of a desired grade and of a desired shade of color, comprising the steps of:

mixing a color concentrate material and a nanofiller concentrate material to form a color concentrate material and nanofiller concentrate material mixture;

extruding and pelletizing the color concentrate material and nanofiller concentrate material mixture to form a color concentrate pellet; and then mixing the color concentrate pellet with a base grade of polymeric material in a ratio sufficient to render the desired grade of filled polymeric compound and the desired shade of color, the desired grade being different from the base grade, and the ratio being color concentrate pellet to base grade polymeric material.

25. The method as defined in claim 1 wherein the color concentrate material is in a form selected from pellets, flakes, granules, and combinations thereof.

* * * * *